(12) United States Patent
Xia et al.

(10) Patent No.: US 11,347,542 B2
(45) Date of Patent: May 31, 2022

(54) DATA MIGRATION METHOD AND APPARATUS

(71) Applicant: Huawei Technologies Co., Ltd., Shenzhen (CN)

(72) Inventors: Yubin Xia, Shanghai (CN); Yu Shen, Shenzhen (CN); Haibo Chen, Shanghai (CN); Zhengde Zhai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 16/549,861

(22) Filed: Aug. 23, 2019

(65) Prior Publication Data

US 2019/0377598 A1 Dec. 12, 2019

Related U.S. Application Data

(63) Continuation of application No. PCT/CN2017/095829, filed on Aug. 3, 2017.

(30) Foreign Application Priority Data

Feb. 23, 2017 (CN) .......................... 201710100246.X

(51) Int. Cl.
*G06F 9/48* (2006.01)
*G06F 21/60* (2013.01)
(Continued)

(52) U.S. Cl.
CPC .......... *G06F 9/4856* (2013.01); *G06F 21/602* (2013.01); *G06F 21/64* (2013.01);
(Continued)

(58) Field of Classification Search
CPC ...... G06F 9/4856; G06F 21/602; G06F 21/64; G06F 9/45558; G06F 2009/4557; G06F 9/48; H04L 9/3247
See application file for complete search history.

(56) References Cited

U.S. PATENT DOCUMENTS 10,048,977 B2 * 8/2018 Palermo .................. H04L 49/70
2012/0159184 A1 6/2012 Johnson et al.
(Continued)

FOREIGN PATENT DOCUMENTS

CN 102473224 A 5/2012
CN 103399778 A 11/2013
(Continued)

OTHER PUBLICATIONS

Victor Costan and Srinivas Devadas, Intel SGX Explained, 2016, International Association for Cryptological Research (IACR Cryptol), pp. 1-118 (Year: 2016).*

(Continued)

*Primary Examiner* — Robert B Leung
*Assistant Examiner* — Bruce S Ashley
(74) *Attorney, Agent, or Firm* — Leydig, Voit & Mayer, Ltd.

(57) ABSTRACT

The disclosure relates to the communications technologies field, and in particular, to a data migration method and apparatus, to implement data migration in an enclave page cache (EPC), to improve consistency between data of an application program before migration and that after migration. The method includes: obtaining, by a source host, a migration instruction, where the migration instruction is used to instruct to migrate a target application created with an enclave to a destination host; invoking, by the source host, a migration control thread preset in the enclave of the target application, to write running status data of the target application in an EPC into target memory of the source host, where the target memory is an area other than the EPC in memory of the source host; and sending, by the source host, the running status data of the target application in the target memory to the destination host.

14 Claims, 5 Drawing Sheets

(51) Int. Cl.
*G06F 21/64* (2013.01)
*G06F 9/455* (2018.01)
*H04L 9/32* (2006.01)

(52) U.S. Cl.
CPC .. *G06F 9/45558* (2013.01); *G06F 2009/4557* (2013.01); *H04L 9/3247* (2013.01)

(56) References Cited

U.S. PATENT DOCUMENTS

| | | |
|---|---|---|
| 2013/0159726 A1 | 6/2013 | McKeen et al. |
| 2015/0039891 A1* | 2/2015 | Ignatchenko ....... H04L 63/0853 718/1 |
| 2015/0205542 A1 | 7/2015 | Antony |
| 2015/0370628 A1 | 12/2015 | Zmudzinski |
| 2016/0149912 A1 | 5/2016 | Scott-Nash et al. |
| 2016/0378688 A1 | 12/2016 | Rozas et al. |
| 2017/0054557 A1* | 2/2017 | Rozas ................... H04L 9/0891 |
| 2018/0183580 A1* | 6/2018 | Scarlata ................ H04L 9/3247 |

FOREIGN PATENT DOCUMENTS

| | | |
|---|---|---|
| CN | 103885719 A | 6/2014 |
| CN | 104283853 A | 1/2015 |
| CN | 104346575 A | 2/2015 |
| CN | 105022658 A | 11/2015 |
| CN | 105678191 A | 6/2016 |
| CN | 105700945 A | 6/2016 |
| CN | 105791175 A | 7/2016 |
| CN | 105955809 A | 9/2016 |
| CN | 105956465 A | 9/2016 |
| CN | 106095576 A | 11/2016 |
| CN | 106161076 A | 11/2016 |
| CN | 106169994 A | 11/2016 |
| WO | 2015171478 A1 | 11/2015 |

OTHER PUBLICATIONS

Clark et al., "Live migration of virtual machines," Proceedings of the Symposium on Networked Systems Design and Implementation, XP002443245, pp. 273-286, Usenix Association, Berkeley, CA (2005).

Park et al., "Toward Live Migration of SGX-Enabled Virtual Machines," 2016 IEEE World Congress on Services Computing, XP032953947, pp. 111-112, 27, Institute of Electrical and Electronics Engineers, New York, New York (Jun. 27-Jul. 2, 2016).

"Intel SGX Technology," https://blog.csdn.net/u010071291/article/details/52750372, pp. 1-3, Chinese Software Developer Network Blog (Oct. 20, 2016).

Ahmad et al., "Virtual machine migration in cloud data centers: a review, taxonomy, and open research issues," The Journal of Supercomputing, Springer US, New York, XP35506628, vol. 71, No. 7, pp. 2473-2515 (Mar. 13, 2015).

Anonymous: "Intel 64 and IA-32 Architectures Software Developer's Manual vol. 3D: System Programming Guide, Part4," XP55856899, total 222 pages (Sep. 2015).

Shi Yuan et al., "Security-enhanced live migration based on SGX for virtual machine," Journal on Communications, vol. 38, No. 9, total 11 pages (Sep. 2017). With English abstract.

CN/20180087318.X, Office Action/Search Report, dated Oct. 9, 2021.

* cited by examiner

DATA MIGRATION METHOD AND APPARATUS

CROSS-REFERENCE TO RELATED APPLICATIONS

This application is a continuation of International Application No. PCT/CN2017/095829, filed on Aug. 3, 2017, which claims priority to Chinese Patent Application No. 201710100246.X, filed on Feb. 23, 2017. The disclosures of the aforementioned applications are hereby incorporated by reference in their entireties.

TECHNICAL FIELD

Embodiments of the present disclosure relate to the field of communications technologies, and in particular, to a data migration method and apparatus.

BACKGROUND

In an isolated execution technology of a central processing unit (CPU), a secure execution area (enclave) may be created by using the CPU, to execute a security-sensitive application. Privilege codes such as a virtual machine monitor (VMM), an output system (OS), and a basic input/output system (BIOS) cannot access content in the enclave, thereby protecting a code and data of the sensitivity-sensitive application against attacks from malicious or buggy low-level code. Memory used for a CPU enclave is referred to as an enclave page cache (EPC). An application A is used as an example. An enclave of the application A is an execution environment that is created in an address space of the application A and that is directly protected by the CPU. Some or all codes of the application A may be run in the enclave, and a code run in the enclave is referred to as an enclave code. Running status data such as a data segment, a heap, a stack, and a state save area (SSA) generated by enclave codes of the application A in a running process is stored in an EPC in which the enclave of the application A is located.

In a cloud computing application scenario, some computing entities such as a virtual machine (VM), a container (for example, Docker), and an application may need to be migrated between two different physical hosts. In a migration process, an operating system or a VMM on a source host usually accesses codes and status data of a computing entity in memory, and sends the codes and the status data to a target physical host to reconstruct the computing entity. However, if an application creates or uses the CPU enclave, because only enclave codes of the application are allowed to access codes and data in the enclave while the operating system or the VMM on the source host are not, data stored in an EPC of the enclave cannot be migrated to the target physical host, and consequently, running status data of the application before migration is inconsistent with that after migration.

SUMMARY

Embodiments of the present disclosure provide a data migration method and apparatus, to implement migration of an enclave between different hosts.

To achieve the foregoing objective, the following technical solutions are used in the embodiments of the present disclosure:

According to a first aspect, an embodiment of the present disclosure provides a data migration method. The method includes: obtaining, by a source host, a migration instruction used to instruct to migrate a target application created with an enclave to a destination host; and invoking, by the source host, a migration control thread preset in the enclave of the target application, where the migration control thread is located within the enclave of the target application, and therefore, the migration control thread may access running status data of the target application in an EPC, so that the migration control thread writes the running status data of the target application in the EPC into target memory of the source host in an encrypted and integrity-protected manner. The target memory is an area that is in memory of the source host and that can be directly accessed by an operating system or a VMM. An operating system or a VMM of the source host is allowed to access data in the target memory. Therefore, the source host may send the protected running status data of the target application in the target memory to the destination host, thereby implementing data migration in the EPC, and making data such as running status data of the target application before migration consistent with that after migration.

In a possible design method, the invoking, by the source host, a migration control thread preset in the enclave of the target application, so that the migration control thread writes the running status data of the target application in the EPC into target memory of the source host in an encrypted and integrity-protected manner includes: invoking, by the source host, the migration control thread, to obtain the running status data of the target application from the EPC; and invoking, by the source host, the migration control thread, to write the running status data into the target memory.

In a possible design method, the enclave of the target application further includes N working threads, where N≥1. The invoking, by the source host, the migration control thread, to obtain the running status data of the target application from the EPC includes: invoking, by the source host, the migration control thread when migration starts, to set a global status of the enclave to a migration state; setting, by the source host when the global status is a migration state, a local status of each of the N working threads to a stopped state by waiting until all working threads have been executed or by forcing the working thread through an interrupt to exit the enclave and preventing the working thread from reentering the enclave; and invoking, by the source host, the migration control thread when the local statuses of all the N working threads are a stopped state, to obtain the running status data of the target application in the EPC. In addition, the source host records a value of a current state save area (CSSA) of each forcefully interrupted working thread.

Because a working thread may modify the running status data of the target application in the EPC in a running process, if a local status of any of the N working threads is a busy state, it indicates that the working thread may be modifying running status data of the enclave. In this case, the migration control thread needs to wait until the local status of the working thread becomes a stopped state, and starts a data migration process in the enclave when the migration control thread determines that the local statuses of all the N working threads are a stopped state. In this way, a problem that a running status of the target application before migration is inconsistent with that after migration can be avoided, where the problem occurs when any working thread in the enclave modifies the running status data of the enclave during execution in a migration process of the target application.

In a possible design method, after the invoking, by the source host, the migration control thread, to obtain the running status data of the enclave in the EPC, the method further includes: invoking, by the source host, the migration control thread, to perform encryption and integrity protection operations on the running status data; and the invoking, by the source host, the migration control thread, to write the protected running status data into the target memory includes: invoking, by the source host, the migration control thread, to write the encrypted and integrity-protected running status data into the target memory.

In this way, after the protected running status data is written into the target memory, the VMM, an OS, and a cloud administrator cannot read and modify the running status data, thereby improving confidentiality and integrity of running status data generated in the enclave in a data migration process.

According to a second aspect, an embodiment of the present disclosure provides a data migration method. The method includes: obtaining, by a destination host, running status data of a target application from a source host; restoring, by the destination host, an enclave of the target application in an EPC of memory of the destination host; creating, by the destination host, a migration control thread of the target application in the enclave of the target application; and invoking, by the destination host, the migration control thread, to replicate the running status data to the EPC.

In a possible design method, the restoring, by the destination host, an enclave of the target application in an EPC of memory includes: obtaining, by the destination host, an enclave create record of the target application from the source host, where the enclave create record records a memory address of the enclave of the target application; and restoring, by the destination host, the enclave of the target application in the EPC of the memory based on the memory address.

In a possible design method, the invoking, by the destination host, the migration control thread, to replicate the running status data to the EPC includes: invoking, by the destination host, the migration control thread, to write protected running status data into the EPC; and invoking, by the destination host, the migration control thread, to perform integrity verification and decryption operations on the running status data written into the EPC, and restoring the running status data.

In a possible design method, the destination host obtains, from the source host, a value, recorded by the source host, of a CSSA of each forcefully interrupted thread, and adjusts, by creating a page fault interrupt, a value of a CS SA of each working thread in the target enclave to be the same as the value of the CSSA of the forcefully interrupted thread.

According to a third aspect, an embodiment of the present disclosure provides a source host. The source host includes: an obtaining unit, configured to obtain a migration instruction, where the migration instruction is used to instruct to migrate a target application created with an enclave to a destination host; an execution unit, configured to invoke a migration control thread preset in the enclave of the target application, to write running status data of the target application in an EPC into target memory of the source host in an encrypted and integrity-protected manner, where the target memory is an area that is in memory of the source host and that can be directly accessed by an OS or a VMM; and a sending unit, configured to send the protected running status data of the target application in the target memory to the destination host.

In a possible design method, the execution unit is specifically configured to: invoke the migration control thread, to obtain the running status data of the target application from the EPC; and invoke the migration control thread, to write the running status data in the EPC into the target memory in a protected manner.

In a possible design method, the enclave of the target application further includes N working threads, where N≥1; and the execution unit is specifically configured to: invoke the migration control thread, to set a global status of the enclave to a migration state; and set when the global status is a migration state, a local status of each of the N working threads to a stopped state by waiting until all working threads have been executed or by interrupting the working thread and forcing the working thread to exit the enclave and preventing the working thread from reentering the enclave, where when the local statuses of all the N working threads are a stopped state, the migration control thread can obtain the running status data of the enclave. In addition, the source host records a value of a CSSA of each forcefully interrupted working thread.

In a possible design method, the source host further includes an encryption unit, configured to invoke the migration control thread, to perform encryption and integrity protection operations on the running status data; and the execution unit is specifically configured to invoke the migration control thread, to write the encrypted and integrity-protected running status data into the target memory.

According to a fourth aspect, an embodiment of the present disclosure provides a destination host. The destination host includes: an obtaining unit, configured to obtain running status data of a target enclave from a source host; a restoring unit, configured to restore the target enclave in an EPC of memory of the destination host; a creating unit, configured to create a migration control thread in the target enclave; and a replication unit, configured to invoke the migration control thread, to replicate the running status data to the EPC.

In a possible design method, the restoring unit is specifically configured to: obtain an enclave create record of the target application from the source host, where the enclave create record records a memory address of the enclave of the target application; and restore the enclave of the target application in the EPC of the memory based on the memory address.

In a possible design method, the replication unit is specifically configured to: invoke the migration control thread, to write the running status data into the EPC; and invoke the migration control thread, to perform integrity verification and decryption operations on the running status data, and restore the running status data of the enclave.

In a possible design method, the destination host obtains, from the source host, a value of a CSSA of each forcefully interrupted thread, and adjusts, by creating a page fault interrupt, a value of a CSSA of each working thread in the target enclave to be the same as the value of the CSSA of the forcefully interrupted thread.

According to a fifth aspect, an embodiment of the present disclosure provides a source host. The source host includes a processor, a storage, a bus, and a communications interface. The storage is configured to store a computer-executable instruction. The processor is connected to the storage by using the bus. When the source host runs, the processor executes the computer-executable instruction stored in the storage, so that the source host performs the data migration method according to any possible design method in the first aspect.

According to a sixth aspect, an embodiment of the present disclosure provides a destination host. The destination host includes a processor, a storage, a bus, and a communications interface. The storage is configured to store a computer-executable instruction. The processor is connected to the storage by using the bus. When the destination host runs, the processor executes the computer-executable instruction stored in the storage, so that the destination host performs the data migration method according to any possible design method in the second aspect.

According to a seventh aspect, an embodiment of the present disclosure provides a data migration system. The data migration system includes the source host according to any possible design method in the third aspect and the destination host according to any possible design method in the fourth aspect.

According to an eighth aspect, an embodiment of the present disclosure provides a computer readable storage medium. The computer readable storage medium stores an instruction. When the instruction is run on the source host and/or the destination host, the source host and/or the destination host is enabled to perform the data migration method in the foregoing aspects.

According to a ninth aspect, an embodiment of the present disclosure provides a computer program product including an instruction. When the computer program product is run on the source host and/or the destination host, the source host and/or the destination host is enabled to perform the data migration method in the foregoing aspects.

In the embodiments of the present disclosure, names of the source host and the destination host do not constitute any limitation to the devices. In actual implementation, the devices may be present in other names. The devices fall within the scope of the following claims of the present disclosure and their equivalent technologies provided that functions of the devices are similar to functions of the device in the embodiments of the present disclosure.

In addition, for a technical effect of any design manner in the second aspect to the ninth aspect, refer to technical effects of different design methods in the first aspect. Details are not described herein again.

DESCRIPTION OF EMBODIMENTS

The terms "first" and "second" mentioned below are merely for a purpose of description, and shall not be understood as an indication or implication of relative importance or implicit indication of the number of indicated technical features. Therefore, a feature limited by "first" or "second" may explicitly or implicitly include one or more features. In the description of embodiments of the present disclosure, unless otherwise stated, "plurality of" means two or more.

To easily understand the embodiments of the present disclosure, some terms used in description of the embodiments of the present disclosure are first described herein.

VM: One or more VMs are one or more virtual computers emulated on one physical host by using VM software. The VMs work like real computers. An operating system and an application program may be installed on the VM. The VM may further access a network resource. The VM works like a real computer to the application program running on the VM.

Container: A container is a lightweight application running environment, and is configured to isolate applications of a plurality of tenants on a same physical host. A plurality of containers usually share an operating system kernel. Typical containers include Docker, LXC, and the like.

Figure 1:
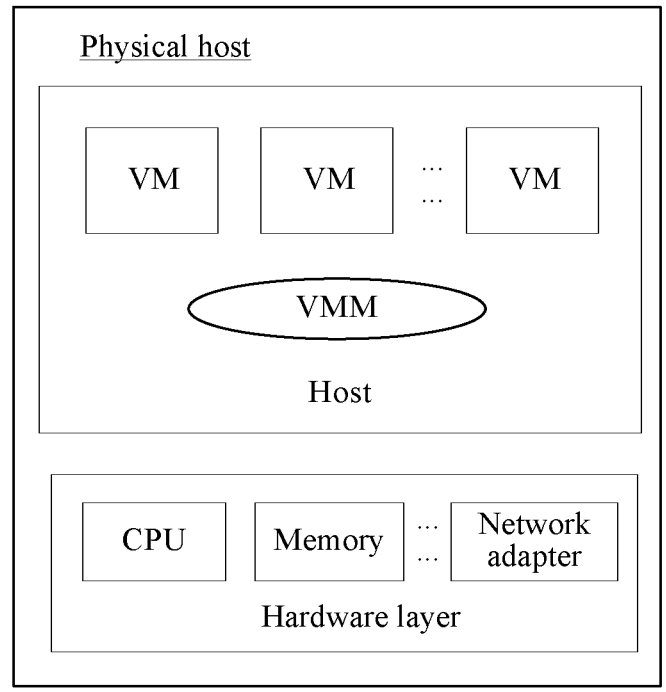
FIG. 1 is a schematic architectural diagram of a running environment of a VM according to an embodiment of the present disclosure.

Hardware layer: A hardware layer is a hardware platform on which a virtual environment runs. As shown in FIG. 1, the hardware layer may include various hardware. For example, a hardware layer of a physical host may include a CPU, memory, a network adapter, a storage, a high-speed/low-speed input/output (I/O) device, and another device having a specific processing function.

Host: A host, as a management layer, is configured to: manage and allocates hardware resources; present a virtual hardware platform for a VM; and implement scheduling and isolation of VMs. For example, as shown in FIG. 1, a VMM may be set in the host. The virtual hardware platform provides various hardware resources to VMs running on the virtual hardware platform, for example, provides a virtual central processing unit (VCPU), virtual memory, a virtual disk, a virtual network adapter, or the like.

It may be understood that the embodiments of the present disclosure may be applied to virtual computing platforms such as Xen, kernel-based virtual machine (KVM), and Docker. This is not limited in the embodiments of the present disclosure.

Figure 2:
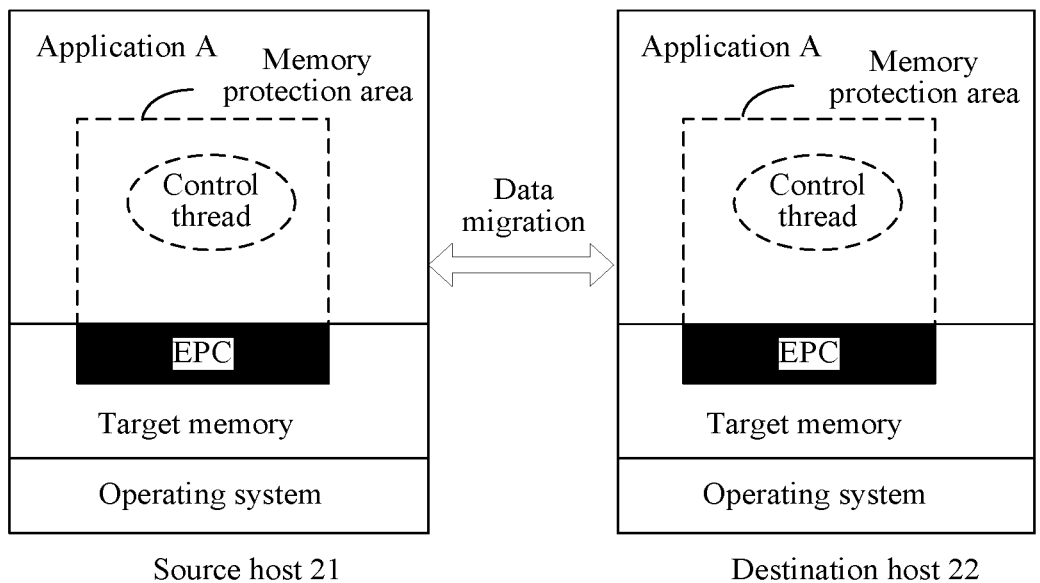
FIG. 2 is a schematic architectural diagram of a data migration system according to an embodiment of the present disclosure.

An embodiment of the present disclosure provides a data migration method, applicable to a data migration system shown in FIG. 2. The system includes a source host 21 and a destination host 22.

An application A runs in the source host 21. The application A is any application created with an enclave (a memory protection area). That is, enclave codes in the application A are run in an EPC of the source host 21. Running status data generated in a running process is stored in the EPC.

Then, when the application A needs to be migrated to the destination host 22, an operating system of the source host 21 usually accesses memory of the source host 21, and sends data such as codes and the running status data of the application A that is stored in the memory to the destination host 22. However, only the enclave codes of the application A are allowed to access, by invoking a CPU of the source host 21, the running status data stored in an EPC in the memory. Therefore, data in the EPC cannot be sent to the destination host 22. As a result, a running state of the application A that is restored by the destination host 22 based on the data sent by the source host 21 may be different from a running state of the application A running in the source host 21.

In view of this, in the data migration method provided in this embodiment of the present disclosure, in an enclave of each target application created with the enclave, for example, the application A in FIG. 2, a migration control thread is created in advance. The migration control thread is located within the enclave of the application A. To be specific, codes of the migration control thread are also the enclave codes of the application A. Therefore, the migration control thread may access running status data of the application A in the EPC, and write the running status data into target memory other than the EPC, namely, memory that can be accessed by the operating system of the source host 21. In addition, after the running status data is migrated to the destination host, the migration control thread may be further used to restore the migrated running status data to an EPC in which the enclave of the application A in the destination host is located.

In this way, after the source host 21 obtains a migration instruction (where the migration instruction is used to instruct to migrate a target application created with an enclave, for example, the application A, to the destination host 22), because the migration control thread in the enclave of the application A has access rights of accessing the EPC, the source host 21 may invoke the migration control thread, and write the running status data of the application A in the EPC into target memory of the source host 21. The operating system of the source host 21 is allowed to access data in the target memory. Therefore, subsequently, the source host 21 can follow an existing data migration method to send, to the destination host 22, related data such as the running status data written into the target memory and codes of the application A that are originally stored in the target memory.

After receiving the related data of the application A that is sent by the source host 21, the destination host 22 may first restore the enclave of the application A in an EPC of the destination host 22 for the application A, and further create a migration control thread of the application A in the enclave. The migration control thread has access rights of accessing the EPC. Therefore, the created migration control thread may replicate the running status data to the EPC in which the enclave of the application A is located, and decrypt and restore a running status of the enclave in the application A.

In this way, according to the method, data migration in the EPC can be implemented in an application migration process, so that data such as running status data of an application before migration is consistent with that after migration.

Certainly, the migration control thread may further perform encryption and integrity protection operations on running status data of a target application in an EPC, thereby ensuring confidentiality and integrity of the running status data in a migration process. This is described in detail in subsequent embodiments. Therefore, the details are not described herein again.

In addition, the data migration method provided in this embodiment of the present disclosure is applicable to a migration process of a VM in a cloud virtualization environment, and is also applicable to a migration process, between any two physical hosts, of an application and a container including an enclave. This is not limited in this embodiment of the present disclosure. In the subsequent embodiments, the migration process of the VM is used as an example to describe the data migration method provided in this embodiment of the present disclosure.

Figure 3:
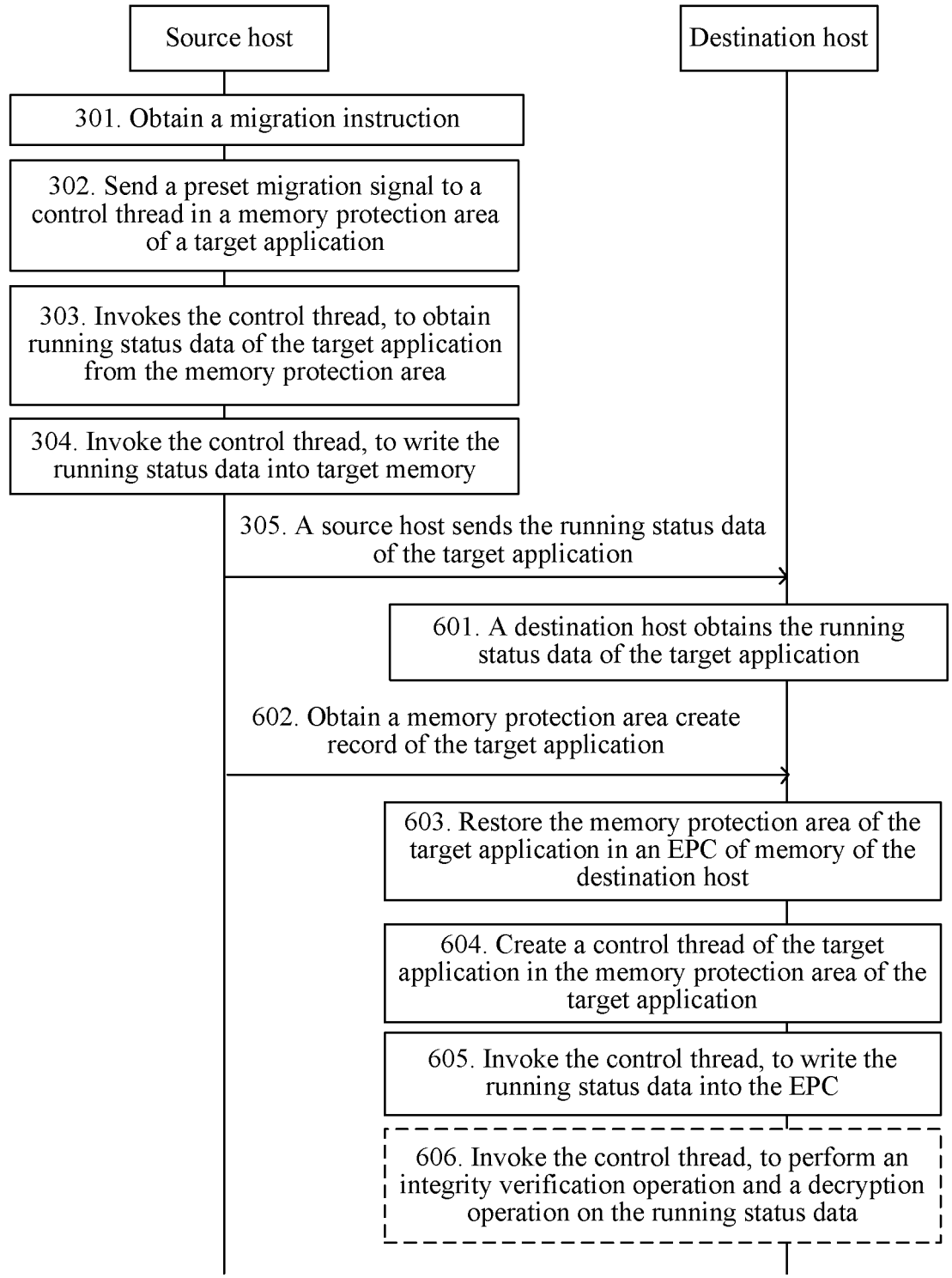
FIG. 3 is a schematic diagram of interaction of a data migration method according to an embodiment of the present disclosure.

FIG. 3 is a schematic diagram of interaction of a data migration method according to an embodiment of the present disclosure. The method includes the following steps.

301. A source host obtains a migration instruction, where the migration instruction is used to instruct the source host to migrate a target application created with an enclave to a destination host.

Migration of a VM is used as an example. A host runs on the source host, at least one VM runs on the host, and at least one application may run in each VM. Then, when a target VM (where the target VM is one of the at least one VM) is migrated to the destination host, an application in the target VM also needs to be migrated to the destination host. The application in the target VM may include the target application created with the enclave.

Figure 4:
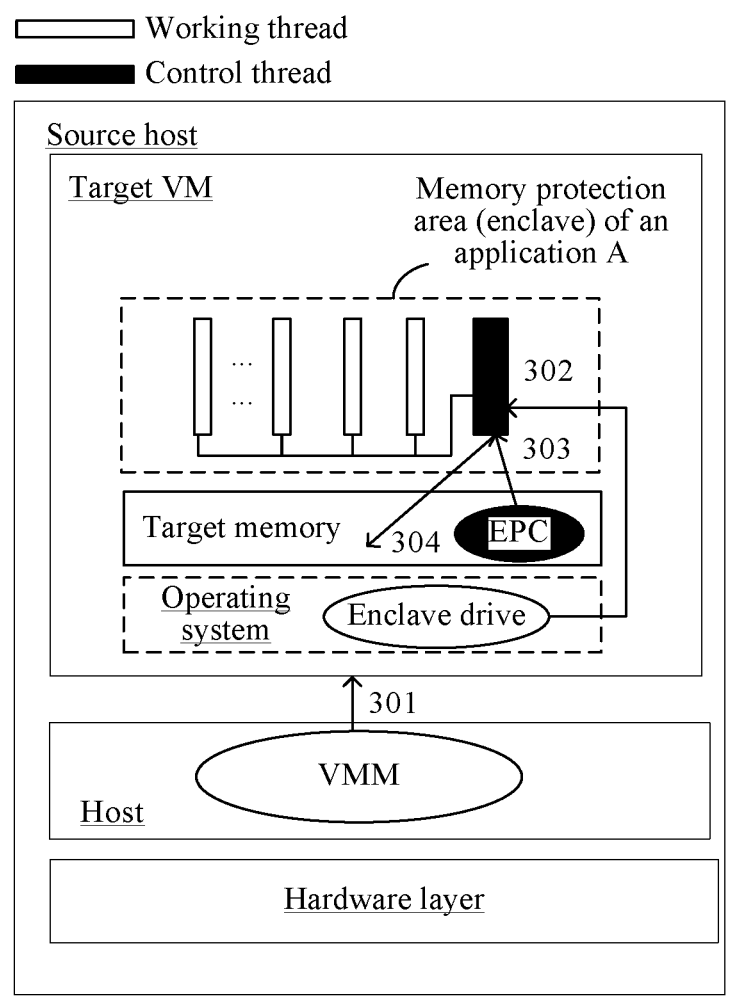
FIG. 4 is a schematic diagram of an application scenario of a data migration method according to an embodiment of the present disclosure.

In this case, as shown in FIG. 4, a VMM in the host may send the migration instruction to the target VM, to indicate, to the target VM, that the source host is about to migrate the target application, for example, an application A, to the destination host.

Alternatively, the target VM may periodically query, in a manner of polling monitoring, the VMM whether the VMM generates the migration instruction. If the VMM generates the migration instruction, the target VM obtains the migration instruction from the VMM. This is not limited in this embodiment of the present disclosure.

302. The source host invokes an enclave drive, to send a preset migration signal to a migration control thread in the enclave of the target application.

After the target VM obtains the migration instruction, it is checked whether an application including an enclave is created in the target VM. For the application including the enclave, for example, the application A in FIG. 4, the application A usually needs to run N (N≥1) working threads in an enclave of the application A. In this embodiment of the present disclosure, one migration control thread is preset in the enclave of the application A. The migration control thread is specially used for migrating data in an EPC area in which the enclave is located.

Specific codes executed by the migration control thread are compiled in advance in the enclave of the application A. The codes are specially used for migrating running status data that is generated in the enclave and that is in the EPC. Then, after the source host obtains the migration instruction, a new thread may be created to specially execute the codes compiled in advance. In this case, the new thread is the migration control thread. The migration control thread executes corresponding codes after receiving the migration signal, to complete a data migration process of steps 303 and 304. The working thread ends running when the data migration process ends.

Then, if the application including an enclave, for example, the application A, is created in the target VM, as shown in FIG. 4, the target VM may invoke an enclave drive in an operating system of the target VM, to send a preset migration signal to the migration control thread in the enclave of the application A, to trigger the migration control thread to perform the data migration process.

For example, the migration signal may be a signal predefined by a person skilled in the art based on actual experience. This is not limited in this embodiment of the present disclosure.

303. The source host invokes the migration control thread, to obtain running status data of the target application from the EPC.

The running status data may be specifically stack data, heap data, SSA data, and the like that are generated by enclave codes of the target application during running in the enclave of the target application. This is not limited in this embodiment of the present disclosure.

Figure 5:
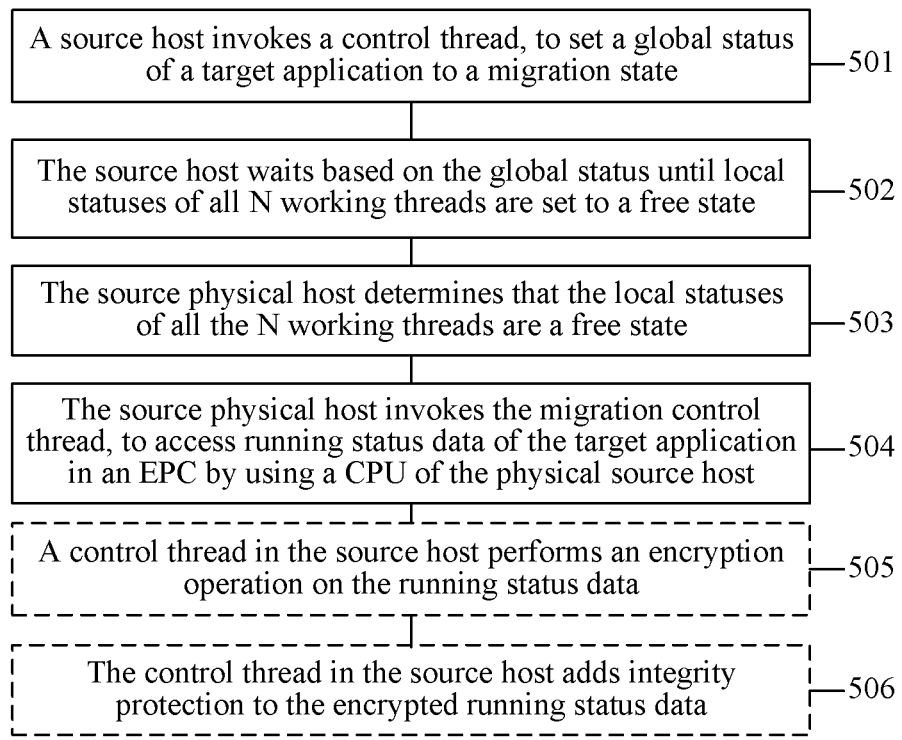
FIG. 5 is a schematic flowchart of a data migration method according to an embodiment of the present disclosure.

Specifically, after the migration control thread in the enclave of the application A receives the migration signal, as shown in FIG. 5, steps 501 to 506 may be performed, to access running status data of the application A in the EPC in which the enclave is located.

501. The source host invokes the migration control thread, to set a global status of the target enclave to a migration state.

Specifically, one global identifier may be set in the enclave of the application A. The global identifier is used to indicate a global status. The global identifier can be found by the N working threads. Then, after the migration control thread in the enclave receives the migration signal, the migration control thread may set the global status of the enclave to a migration state. For example, the global identifier is set to 1, and it indicates that running status data of the enclave currently needs to be migrated.

502. The source host waits based on the global status until local statuses of all the N working threads become a stopped state.

For each of the N working threads, the source host presets one local identifier. The local identifier is used to indicate the local status of the working thread. When the working thread is started, the working thread sets the local status of the working thread to a busy state (busy), and it indicates that the working thread is being run, and the working thread may modify the running status data of the application A in the EPC in a running process.

Therefore, to ensure that a running status of the application A before migration is consistent with that after migration, in this embodiment of the present disclosure, when the working thread is started, the working thread sets the local status of the working thread to a busy state. Further, the working thread queries a current global identifier. If the global identifier is 1 (to be specific, the global status is a migration state), the working thread may set the local status corresponding to the working thread to a stopped state after execution of the working thread is finished or the working thread is forced to exit the enclave, to inform the migration control thread.

503. The source host determines that the local statuses of all the N working threads are a stopped state.

For example, the source host may determine, by invoking the migration control thread, that the local statuses of all the N working threads are a stopped state. Alternatively, each of the N working threads sets the local status of the working thread to a stopped state. This is not limited in this embodiment of the present disclosure.

In a possible implementation, for the migration control thread in the enclave, after the migration control thread sets the global status of the enclave to a migration state, the migration control thread monitors the local statuses of the N working threads. If the local status of any of N working threads is a busy state, it indicates that the working thread may be modifying the running status data of the application A in the EPC. In this case, the migration control thread needs to wait until the local status of the working thread becomes a stopped state. When the migration control thread determines that the local statuses of all the N working threads are a stopped state, proceed to steps 504 to 506.

In another possible implementation, when the migration control thread in the enclave detects that any one or more of the N working threads (for example, a working thread 1) is in a busy state, if the source host intends to start data migration immediately, all working threads in a busy state may be forced through an interrupt (for example, a clock interrupt) to exit the enclave. After exiting the enclave, each working thread may check whether the global status is 1. If the global status is 1, the working thread quits reentering the enclave and sets the local status of the working thread to a stopped state (free).

Usually, if a working thread in the enclave is interrupted during execution, running status data, for example, a value of a general-purpose register of a CPU, of each working thread in the enclave, is automatically stored by the CPU in the SSA, a stack pointer CSSA of the SSA is increased by 1, and the CPU executes an interrupt handler after exiting the enclave.

When the source host forces all the working threads in a busy state through an interrupt to exit the enclave, running status data of the working threads is automatically stored into the SSA. A CSSA of each forcefully interrupted thread is increased by 1. In this case, the source host may record a value of the CSSA of each working thread. In this way, after the source host subsequently migrates a value of a CSSA to the destination host, the destination host may restore a current execution status of the working thread 1 based on the value of the CSSA, to ensure that a running status of the target application before migration is consistent with that after migration. In addition, when the target application created with an enclave is migrated between the source host and the migration destination host, the source host does not need to wait until execution of all working threads in the enclave of the target application is finished before performing migration, thereby improving migration efficiency of the target application.

In another implementation method, if the source host can accept a waiting time, the source host may wait until execution of all the working threads is finished, and all the working threads set the local statuses to a stopped state after exiting the enclave. When the local statuses of all the working threads are a stopped state, the source host reads running status data of the enclave.

When the local statuses of all the N working threads are a stopped state, steps 504 to 506 may continue to be performed.

504. The source host invokes the migration control thread, to access running status data of the target application in the EPC by using a CPU of the source host.

The migration control thread is located within the enclave of the application A. Therefore, the migration control thread has rights of accessing the EPC in which the enclave is located. Then, the migration control thread may access, by using the CPU of the source host, the running status data of the application A in the EPC in which the enclave is located, and further replicate the running status data of the application A.

505. A migration control thread in the source host performs an encryption operation on the running status data.

506. The migration control thread in the source host adds integrity protection to the encrypted running status data.

For example, the source host may add the integrity protection to the encrypted running status data by using a message authentication code (MAC) or a digital signature.

Herein, encryption may be performed before integrity protection is added, or the integrity protection may be added before encryption is performed. To be specific, a sequence of performing steps 505 and 506 is not limited in this embodiment of the present disclosure.

In steps 505 and 506, the source host may obtain an encryption key and a MAC key by using a remote attestation technology of the enclave.

Subsequently, after the source host writes encrypted and integrity-protected running status data into target memory, an entity such as an operating system, a virtual monitor, and an administrator without the encryption key cannot read the running status data, and an entity without the MAC key cannot tamper with the data, thereby improving confidentiality and integrity of running status data generated in the enclave in a data migration process.

Herein, steps 501 to 506 are performed, so that the migration control thread accesses the running status data of the target application in the EPC by invoking the CPU of the source host.

304. The source host invokes the migration control thread, to write the running status data into the target memory.

The target memory in this embodiment of the present disclosure is an area other than the EPC in memory of the source host. The area may be accessed by the operating system or the VMM of the source host.

Specifically, the migration control thread writes the encrypted and integrity-protected running status data into the target memory. In this way, though the running status data is written into the target memory that can be accessed by the operating system, because the running status data has been encrypted and integrity-protected, security of running status data in the target memory is improved.

305. The source host sends the running status data of the target application to the destination host.

In the target memory of the source host, related data such as codes of the application A, an enclave create record of the application A (where the enclave create record records a memory address of the enclave created in the application A), and a CSSA of each working thread is further stored. In step 305, the source host may send the data, the running status data of the target application, and the related data of the target VM to the destination host together. The destination host restores the target VM, and restores the application A in the target VM, to implement a migration process of the application A.

Still, FIG. 3 shows a data migration method according to an embodiment of the present disclosure. The method includes the following steps.

601. A destination host obtains running status data of a target application from a source host.

602. The destination host obtains an enclave create record of the target application and a CSSA of each working thread from the source host, where the enclave create record records a memory address of an enclave of the target application.

Specifically, the source host may send, to the destination host, related information such as codes of the target application (including enclave codes run inside the enclave and codes run outside the enclave), the running status data, the enclave create record, and the CSSA of each working thread in the target VM.

Optionally, the running status data is encrypted and integrity-protected running status data.

603. The destination host restores the enclave of the target application in an EPC of memory of the destination host based on the memory address.

604. The destination host creates a migration control thread of the target application in the enclave of the target application.

605. The destination host invokes the migration control thread, to write the running status data into the EPC.

After the destination host receives the related information of the target VM, a target VM may be first created on a host of the destination host. Further, an initial target application is created in the newly created target VM based on the received codes of the target application. In this case, a running status of the target application may be a preset initial value.

In addition, some codes in the target application may not be run within the enclave of the target application. Therefore, an operating system of the destination host has access rights to running status data generated during running of the codes. Then, the destination host may invoke the operating system of the destination host to first restore the running status data in the initial target application.

Only the enclave codes located within the enclave of the target application have access rights to running status data generated by enclave codes run in the enclave of the target application. Therefore, the destination host may first create the enclave, namely, the enclave of the target application, for the target application in the EPC of the memory of the destination host.

Specifically, in step 603, the destination host may create a new enclave in the EPC of the destination host based on the memory address recorded in the enclave create record of the target application, and load enclave codes of the target application into the new enclave to be used as an enclave of the target application after restoration.

However, a running status of the enclave of the target application has not been restored yet. Therefore, in step 604, the destination host creates a migration control thread for the target application in the enclave of the target application. Further, in step 605, the migration control thread writes the running status data generated by the enclave codes and obtained in step 601 into an EPC in which the enclave is located, and further restore a running status of the entire target application.

Further, if data migrated from the source host includes a CSSA of a working thread (for example, a working thread 1), it indicates that the working thread 1 is forced to exit the enclave through an interrupt, to be specific, execution of the working thread 1 is not finished on the source host. Therefore, the destination host needs to restore execution progress of the working thread 1 on the source host, so that a running status of the target application before migration is kept consistent with that after migration.

Usually, a default initial value of a CSSA that is set in the destination host is different from a value of the CSSA that is recorded in the running status data. For example, the default initial value of the CSSA is 0, while the value of the CSSA that is recorded in the running status data is not 0 (to be specific, an interrupt occurs in the enclave during migration). In this case, the destination host may adjust a CSSA of the working thread 1 by actively triggering a page fault interrupt until a value of the CSSA of the working thread 1 is the same as a value of the CSSA that is recorded in the source host.

In this way, the destination host may restore the execution progress of the working thread 1 based on the value of the CSSA and a data segment, stack data, heap data, and SSA data in the enclave that are recorded in the running status data, so that unfinished execution of the working thread 1 on the source host may continue on the destination host.

606. The destination host invokes the migration control thread, to perform an integrity verification operation and a decryption operation on the running status data.

Optionally, if the source host has performed encryption and integrity protection operations on running status data generated by the enclave codes when sending the running status data, the destination host further needs to obtain a key used during encryption and an integrity key (for example, a MAC key or a signature key) used during integrity protection, to restore a running status of the target application.

Herein, a sequence of performing the integrity verification and the decryption operation is opposite to that of performing steps 505 and 506. To be specific, if the encryption is performed before the integrity protection in steps 505 and 506, herein, the integrity verification needs to be performed before the decryption. If the integrity protection performed before the encryption in steps 505 and 506, herein, the decryption needs to performed before the integrity verification.

It may be understood that, to implement the foregoing functions, the source host, the destination host, or the like includes corresponding hardware structures and/or software modules for performing the functions. A person skilled in the art should easily be aware that, in combination with examples of units and algorithms steps described in the embodiments disclosed in this specification, the embodiments of the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present disclosure.

In the embodiments of the present disclosure, functional modules of the source host, the destination host, or the like may be divided according to the foregoing method example. For example, functional modules may be divided corresponding to the functions, or two or more functions may be integrated into one processing module. The integrated module may be implemented in a form of hardware, or may be implemented in a form of a software functional module. It should be noted that, in the embodiments of the present disclosure, module division is exemplary, and is merely a logical function division. In actual implementation, another division manner may be used.

Figure 6:
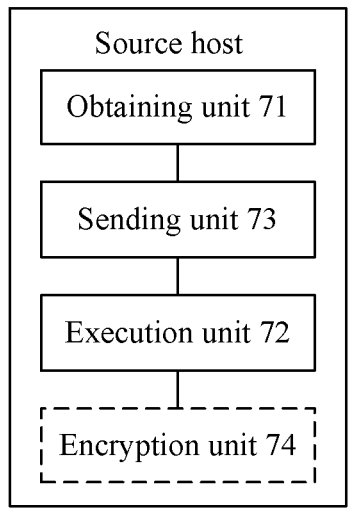
FIG. 6 is a schematic structural diagram of a source host according to an embodiment of the present disclosure.

When the functional modules are divided corresponding to the functions, FIG. 6 is a possible schematic structural diagram of the source host in the embodiments. The source host includes: an obtaining unit 71, an execution unit 72, a sending unit 73, and an encryption unit 74.

The obtaining unit 71 is configured to support the source host in performing the process 301 in FIG. 3. The execution unit 72 is configured to support the source host in performing the processes 303 and 304 in FIG. 3 and the processes 501 to 504 in FIG. 5. The sending unit 73 is configured to support the source host in performing the processes 302 and 305 in FIG. 3. The encryption unit 74 is configured to support the source host in performing the processes 505 and 506 in FIG. 5. For all related content of the steps in the foregoing method embodiments, refer to function descriptions of corresponding functional modules, and details are not described herein again.

Figure 7:
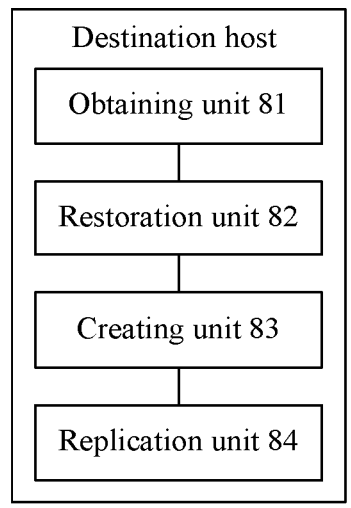
FIG. 7 is a schematic structural diagram of a destination host according to an embodiment of the present disclosure.

When the functional modules are divided corresponding to the functions, FIG. 7 is a possible schematic structural diagram of the destination host in the embodiments. The destination host includes: an obtaining unit 81, a restoration unit 82, a creating unit 83, and a replication unit 84.

The obtaining unit 81 is configured to support the destination host in performing the process 601 in FIG. 6. The restoration unit 82 is configured to support the destination host in performing the processes 602 and 603 in FIG. 6. The creating unit 83 is configured to support the destination host in performing the process 604 in FIG. 6. The replication unit 84 is configured to support the destination host in performing the processes 605 and 606 in FIG. 6. For all related content of the steps in the foregoing method embodiments, refer to function descriptions of corresponding functional modules, and details are not described herein again.

Figure 8:
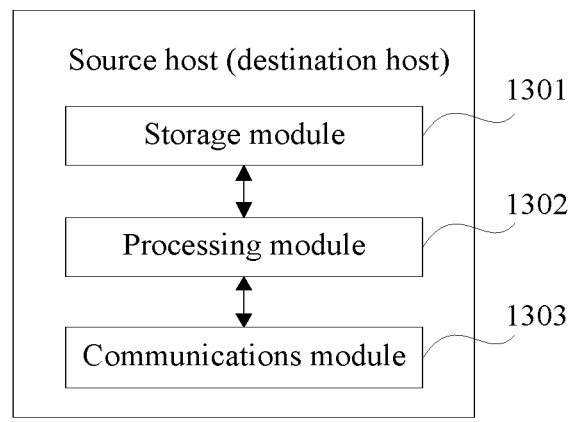
FIG. 8 is a schematic diagram of a hardware structure of a source host (or a destination host) according to an embodiment of the present disclosure.

When an integrated unit is used, FIG. 8 is a possible schematic structural diagram of the source host (or the destination host) in the foregoing embodiments. The source host (or the destination host) includes a processing module 1302 and a communications module 1303. The processing module 1302 is configured to control and manage action of the source host (or the destination host). The communications module 1303 is configured to support the source host (or the destination host) in communicating with another network entity. The source host (or the destination host) may further include a storage module 1301, configured to store program codes and data of the source host (or the destination host).

The processing module 1302 may be a processor or a controller, such as a CPU, a general purpose processor, a digital signal processor (DSP), an application-specific integrated circuit (ASIC), a field programmable gate array (FPGA), or another programmable logical device, a transistor logical device, a hardware component, or a combination thereof. The processor/controller may implement or execute various example logical blocks, modules, and circuits described with reference to content disclosed in the embodiments of the present disclosure. Alternatively, the processor may be a combination of processors implementing a computing function, for example, a combination of one or more microprocessors, or a combination of the DSP and a microprocessor. The communications module 1303 may be a transceiver, a transceiver circuit, a communications interface, or the like. The storage module 1301 may be a storage.

When a VM runs in the source host (or the destination host), a schematic architectural diagram of the source host (or the destination host) is shown in FIG. 1.

Further, an embodiment of the present disclosure further provides a data migration system. The system includes the source host 21 and the destination host 22 shown in FIG. 2.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile dis (DVD)), a semiconductor medium (for example, a solid state disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data migration method, comprising:
   obtaining, by a source host, a migration instruction, wherein the migration instruction is used to instruct to migrate a target application created with an enclave to a destination host;
   invoking, by the source host, a migration control thread preset in the enclave of the target application, to obtain running status data of the enclave from an enclave page cache (EPC);
   invoking, by the source host, the migration control thread, to write the running status data of the enclave in the EPC into target memory of the source host, wherein the target memory is an area other than the EPC in memory of the source host; and
   sending, by the source host, the running status data of the target application in the target memory to the destination host.

2. The method according to claim 1, wherein the enclave of the target application further comprises N working threads, wherein N≥1, and wherein invoking, by the source host, the migration control thread, to obtain the running status data of the target application from the EPC comprises:
   invoking, by the source host, the migration control thread when the migration control thread receives a preset migration signal, to set a global status of the target enclave to a migration state;
   setting, by the source host, a local status of each of the N working threads to a stopped state when the global status is a migration state; and
   invoking, by the source host, the migration control thread when the local statuses of all the N working threads are a stopped state, to access the running status data of the target application in the EPC by using a CPU of the source host.

3. The method according to claim 2, wherein the setting, by the source host, a local status of each of the N working threads to a stopped state when the global status is a migration state comprises:
   modifying, by the source host when the N working threads comprise a working thread whose local status is a busy state, the local status of the working thread to a stopped state through an interrupt; and
   recording, by the source host, a current state save area (CSSA) of the working thread;
   or
   setting, by the source host after execution of all working threads whose local statuses are a busy state is finished, a local status of each working thread to a stopped state.

4. The method according to claim 1, further comprising, after the invoking, by the source host, the migration control thread, to obtain the running status data of the target application from the EPC:
   invoking, by the source host, the migration control thread, to perform an encryption operation on the running status data; and
   adding integrity protection to the encrypted running status data, wherein the integrity protection can be a digital signature operation performed by using a digital signature or a message authentication code, and
   wherein the invoking, by the source host, the migration control thread, to write the running status data of the target application in the EPC into the target memory comprises:
   invoking, by the source host, the migration control thread, to write the encrypted and integrity-protected running status data into the target memory.

5. A data migration method, comprising:
   obtaining, by a destination host, running status data of a target application from a source host;
   restoring, by the destination host, an enclave of the target application in an enclave page cache (EPC) of memory;
   creating, by the destination host, a migration control thread of the target application in the enclave of the target application;
   invoking, by the destination host, the migration control thread, to write the running status data into the EPC; and
   invoking, by the destination host, the migration control thread, to perform decryption and integrity verification on the running status data written into the EPC.

6. The method according to claim 5, wherein the restoring, by the destination host, the enclave of the target application in an EPC of memory comprises:
   obtaining, by the destination host, an enclave create record of the target application from the source host, wherein the enclave create record records a memory address of the enclave of the target application; and
   restoring, by the destination host, the enclave of the target application in the EPC of the memory based on the memory address.

7. The method according to claim 5, wherein the method further comprises:
   obtaining, by the destination host, a current state save area (CSSA) of each working thread in the enclave of the target application from the source host; and
   modifying, by the destination host through an interrupt if a value of a CSSA of a target working thread is not zero, the value of the CSSA of the target working thread to a value of the CSSA recorded in the source host.

8. A source host, comprising:
   a processor; and
   a storage device connected to the processor, the storage device having stored thereon program instructions which, when executed by the processor, cause the source host to:
   obtain a migration instruction, wherein the migration instruction is used to instruct to migrate a target application created with a memory protection area enclave to a destination host;
   invoke a migration control thread preset in the enclave of the target application, to obtain running status data of the enclave from an enclave page cache (EPC);
   invoke the migration control thread, to write the running status data of the enclave in the EPC into target memory of the source host, wherein the target memory is an area other than the EPC in memory of the source host; and send the running status data of the target application in the target memory to the destination host.

9. The source host according to claim 8, wherein the enclave of the target application further comprises N working threads, wherein N≥1, and wherein, when executed by the processor, the program instructions further cause the source host to:

invoke the migration control thread, to set a global status of the enclave to a migration state;

set a local status of each of the N working threads to a stopped state when the global status is a migration state; and invoke the migration control thread when the local statuses of all the N working threads are a stopped state, to access the running status data of the target application in the EPC by using a central processing unit (CPU) of the source host.

10. The source host according to claim 9, wherein, when executed by the processor, the program instructions further cause the source host to:

modify, when the N working threads comprise a working thread whose local status is a busy state, the local status of the working thread to a stopped state through an interrupt; and record a current state save area (CSSA) of the working thread;

or set, after all working threads whose local statuses are a busy state have been executed, a local status of each working thread to a stopped state.

11. The source host according to claim 8, wherein, when executed by the processor, the program instructions further cause the source host to:

invoke the migration control thread, to perform encryption and integrity protection operations on the running status data, wherein the integrity protection can be implemented by using a message authentication code or a signature algorithm; and invoke the migration control thread, to write the encrypted and integrity-protected running status data into the target memory.

12. A destination host, comprising:

a processor; and a storage device connected to the processor, the storage device having stored thereon program instructions which, when executed by the processor, cause the destination host to:

obtain running status data of a target application from a source host;

restore an enclave of the target application in an enclave page cache (EPC) of memory of the destination host;

create a migration control thread of the target application in the enclave of the target application;

invoke the migration control thread, to write the running status data into the EPC; and invoking the migration control thread, to perform decryption and integrity verification on the running status data written into the EPC.

13. The destination host according to claim 12, wherein, when executed by the processor, the program instructions further cause the destination host to:

obtain an enclave create record of the target application from the source host, wherein the enclave create record records a memory address of the enclave of the target application; and restore the enclave of the target application in the EPC of the memory based on the memory address.

14. The destination host according to claim 13, wherein, when executed by the processor, the program instructions further cause the destination host to:

obtain a current state save area (CSSA) of each working thread in the enclave of the target application from the source host; and modify, through an interrupt if a value of a CSSA of a target working thread is not zero, the value of the CSSA of the target working thread to a value of the CSSA recorded in the source host.

* * * * *